US006913440B2

(12) United States Patent
Ciacci et al.

(10) Patent No.: US 6,913,440 B2
(45) Date of Patent: Jul. 5, 2005

(54) VARIABLE-GEOMETRY TURBINE STATOR BLADE, PARTICULARLY FOR AIRCRAFT ENGINES

(75) Inventors: Paolo Lorenzo Ciacci, Turin (IT); Daniele Coutandin, Turin (IT); Domenico Dalle Crode, Turin (IT)

(73) Assignee: AVIO S.p.A., Rivalta di Torino (IT)

( * ) Notice: Subject to any disclaimer, the term of this patent is extended or adjusted under 35 U.S.C. 154(b) by 15 days.

(21) Appl. No.: 10/604,620

(22) Filed: Aug. 5, 2003

(65) Prior Publication Data

US 2004/0096321 A1 May 20, 2004

(30) Foreign Application Priority Data

Aug. 6, 2002 (IT) ...................................... TO2002A0699

(51) Int. Cl.[7] .............................. F01D 9/06; F01D 17/16
(52) U.S. Cl. ...................... 415/115; 415/160; 416/96 A
(58) Field of Search ................................ 415/115, 116, 415/159, 160, 161, 162; 416/96 R, 96 A, 97 R

(56) References Cited

U.S. PATENT DOCUMENTS

| | | | | |
|---|---|---|---|---|
| 3,066,910 A | * | 12/1962 | Bluck ........................ 416/96 R |
| 3,164,367 A | * | 1/1965 | Lynch ........................ 416/97 R |
| 4,169,692 A | | 10/1979 | McDonough et al. |
| 4,193,738 A | * | 3/1980 | Landis et al. ................ 415/115 |
| 4,214,852 A | * | 7/1980 | Tuley et al. ................. 415/115 |
| 4,314,791 A | * | 2/1982 | Weiler ......................... 415/115 |
| 4,529,357 A | * | 7/1985 | Holland ..................... 416/97 R |
| 4,798,515 A | | 1/1989 | Hsia et al. |
| 6,478,535 B1 | * | 11/2002 | Chung et al. ................ 415/115 |
| 6,682,297 B2 | * | 1/2004 | Schipani et al. ............ 415/115 |
| 6,709,231 B2 | * | 3/2004 | Schipani et al. ............ 415/160 |
| 2003/0017051 A1 | * | 1/2003 | Coutandin et al. ........ 416/97 R |
| 2004/0107538 A1 | * | 6/2004 | Ciacci et al. .................. 16/223 |
| 2004/0109763 A1 | * | 6/2004 | Ciacci et al. ............. 416/97 R |

FOREIGN PATENT DOCUMENTS

| | | | | |
|---|---|---|---|---|
| EP | 1277918 | | 1/2003 | ............. F01D/5/18 |
| GB | 2027811 | | 2/1980 | ............. F02C/3/06 |
| JP | 55-117009 A | * | 9/1980 | ............... 416/96 A |

OTHER PUBLICATIONS

European Search Report for EP 03 01 7855 (Aug. 10, 2004).

\* cited by examiner

*Primary Examiner*—Christopher Verdier
(74) *Attorney, Agent, or Firm*—Howrey Simon Arnold & White LLP

(57) ABSTRACT

A blade for a stator of a variable-geometry turbine, particularly for aircraft engines; the blade has an airfoil profile hinged to a structure of the stator to rotate about an axis, and having a pressure front wall and a suction rear wall; the blade also has two end walls, which are located at opposite ends of the airfoil profile, cooperate in sliding manner with the structure of the stator, and are cooled, in use, by air flowing through a number of holes; the outlets of the holes are located close to the outer edges between the end walls and the front wall to generate a tangential stream of cooling air by virtue of the pressure difference acting on the front and rear walls.

12 Claims, 2 Drawing Sheets

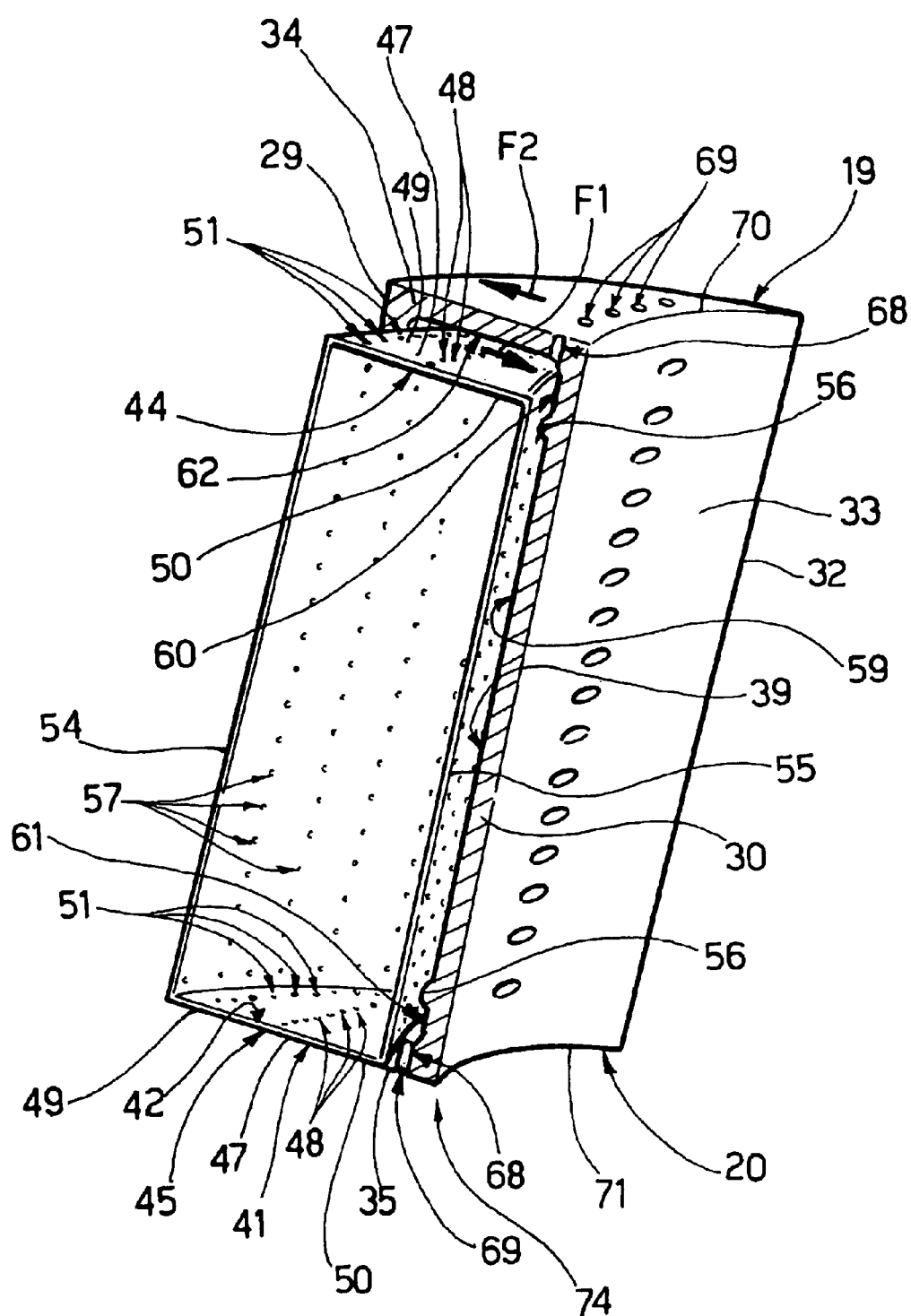

US 6,913,440 B2

VARIABLE-GEOMETRY TURBINE STATOR BLADE, PARTICULARLY FOR AIRCRAFT ENGINES

CROSS REFERENCE TO RELATED APPLICATIONS

This application claims priority under 35 USC §119 to application No. TO 2002A 000699, filed on Aug. 6, 2002 in Italy.

BACKGROUND OF INVENTION

As is known, in variable-geometry turbines, the stator blades can be rotated about respective axes to adjust the gas flow section in the nozzles defined by the blades, and so improve turbine efficiency over a relatively wide range of operating conditions.

More specifically, the stator comprises two annular platforms defining a conduit, along which the gas flows, and which houses the airfoil profiles of the blades. Each airfoil profile is hinged to the two stator platforms, and comprises a tail portion defined radially, with respect to the turbine axis, by two end walls fitted in sliding manner to the platforms.

Given the high temperature of the gas conducted by the turbine, particularly in aircraft applications, the connecting regions between the moving parts of the blades and the fixed parts of the stator must be cooled by streams of cooling air to prevent jamming of the blades and ensure accurate gas flow adjustment. More specifically, a need is felt to cool said end walls and improve heat exchange efficiency to minimize the amount of cooling air required.

SUMMARY OF INVENTION

The present invention relates to a variable-geometry turbine stator blade, particularly for aircraft engines.

It is an object of the present invention to meet the above requirement in a straightforward, low-cost manner.

According to the present invention, there is provided a blade for a stator of a variable-geometry turbine, particularly for aircraft engines; said stator comprising a supporting structure; said blade comprising an airfoil profile hinged to said supporting structure to rotate about an axis inside a conduit and comprising a high-pressure front wall and a low-pressure rear wall; two end walls located at opposite ends of said airfoil profile, with respect to a direction parallel to said axis, and cooperating in sliding manner with said supporting structure; and cooling means for cooling said end walls; said cooling means comprising a number of holes for the passage of a cooling fluid from an inner cavity of said blade; characterized in that said holes have respective outlets close to an outer edge joining at least one of said end walls and said front wall.

BRIEF DESCRIPTION OF DRAWINGS

A non-limiting embodiment of the invention will be described by way of example with reference to the accompanying drawings, in which:

FIG. 2 shows a larger-scale view in perspective, cut away in planes perpendicular to the FIG. 1 plane, of a tail portion of the FIG. 1 blade.

DETAILED DESCRIPTION

Figure 1:
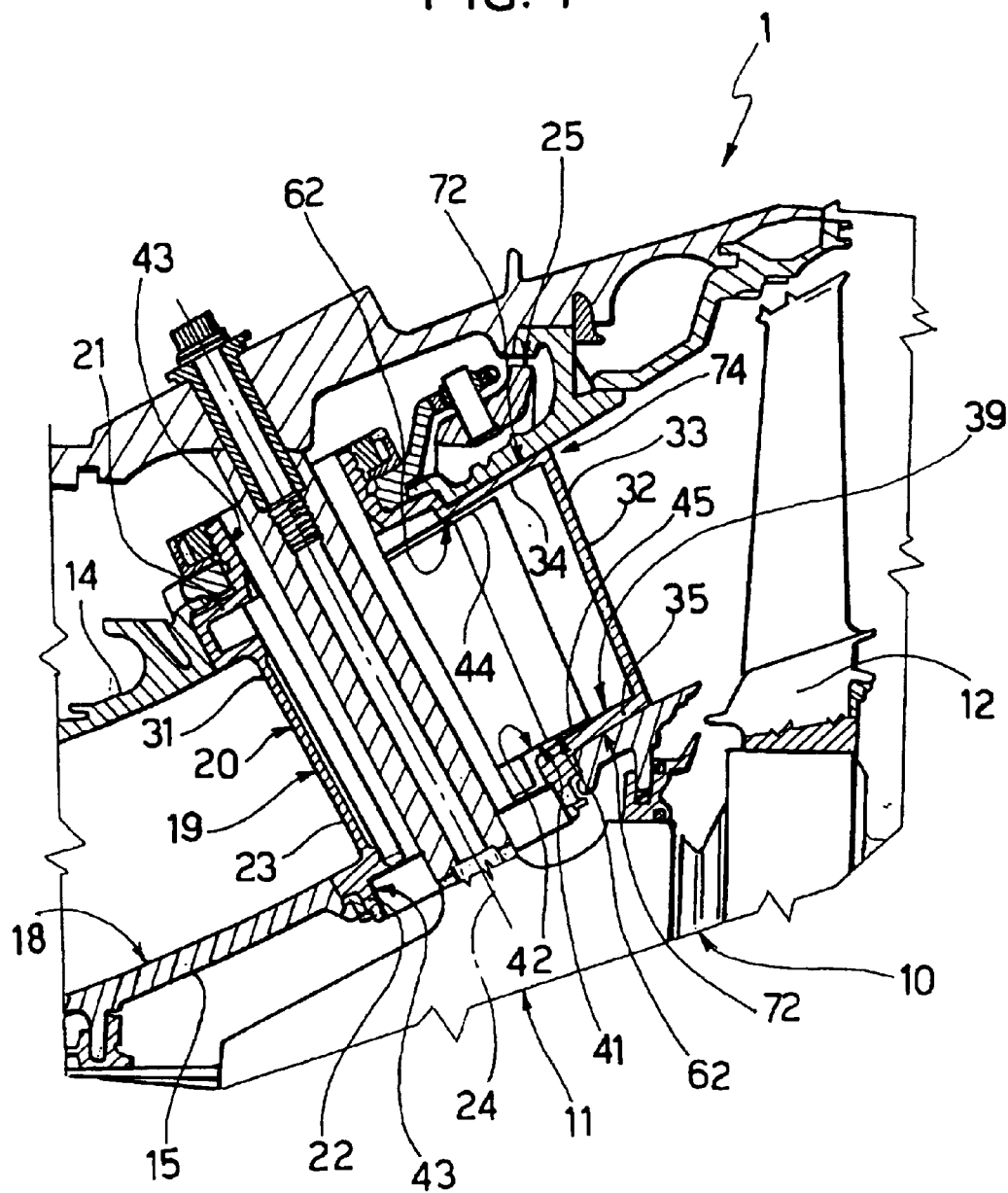
FIG. 1 shows a section, along the plane of the turbine axis (not shown), of a preferred embodiment of the variable-geometry turbine stator blade, particularly for aircraft engines, according to the present invention.

Number 1 in FIG. 1 indicates a variable-geometry axial turbine (shown partly) forming part of an aircraft engine (not shown) and axially symmetrical with respect to its axis (not shown).

Turbine 1 comprises a succession of coaxial stages, only one of which, indicated 10, is shown in FIG. 1 and comprises a stator 11, and a rotor 12 downstream from stator 11.

Stator 11 comprises an outer annular platform 14 and an inner annular platform 15, which are positioned facing and define radially in-between an annular conduit 18 for conducting a stream of gas in expansion and increasing in mean diameter in the gas flow direction.

Platforms 14, 15 support a number of blades 19 (only one shown) equally spaced angularly about the turbine axis, and comprising respective airfoil profiles 20, which are housed inside conduit 18 and define between them, i.e. circumferentially with respect to the turbine axis, a number of nozzles.

As shown in FIG. 1, each blade 19 also comprises two pins 21, 22, which are located at opposite ends of profile 20, are coaxial along an axis 24 incident with the turbine axis, are integral with a front portion 23 of profile 20, and are hinged to respective platforms 14, 15 to permit rotation of profile 20 about axis 24.

More specifically, blades 19 are rotated synchronously about respective axes 24 by an angular positioning assembly 25 shown partly and not described in detail.

Profile 20 of each blade 19 comprises an outwardly convex rear wall 29 (FIG. 2) defining a suction side for the relative nozzle, and an outwardly concave front wall 30 (FIG. 2) defining a pressure side for the relative nozzle; and walls 29 and 30 are connected to each other along a leading edge 31 defining portion 23, and along a trailing edge 32 defining a tail portion 33 of profile 20.

At portion 33, walls 29, 30 are joined to each other by two end walls 34, 35, which are located at opposite ends of profile 20 in a direction parallel to axis 24 or radial with respective to the turbine axis, and cooperate in sliding manner with respective platforms 14, 15 as blades 19 rotate.

As shown in FIGS. 1 and 2, walls 29, 30, 34, 35 define an inner cavity 39 housing a box- or shell-like insert 41 made of sheet metal and in turn defining an inner cavity 42 for receiving, in known manner not described in detail, a stream of cooling air from outside blade 19 and along an axial passage 43 formed through pins 21, 22.

Insert 41 comprises two flat end walls 44, 45 facing respective walls 34, 35 and forced against certain areas (not shown) of walls 34, 35.

With reference to FIG. 2, each wall 44, 45 comprises an intermediate portion 47 having through holes 48 formed in a row substantially parallel to the curved mean "chord" of profile 20; and two end portions 49, 50 located on opposite sides of portion 47 and adjacent to respective walls 29, 30. Portion 50 has no holes, and portion 49 has through holes 51 formed in a row substantially parallel to wall 29 and converging with the row of holes 48 towards edge 32.

Insert 41 also comprises two lateral walls 54, 55 facing respective walls 29, 30 and each forced against two ribs 56 projecting inside cavity 39 and integrally from relative wall 29, 30. Walls 54, 55 have respective holes 57 (FIG. 2), through which respective jets of cooling air flow from cavity 42 and "strike" profile 20 to cool profile 20 in a manner commonly referred to as "impingement".

Walls 54, 29, and likewise walls 55, 30, define an intermediate chamber 59; and two lateral chambers 60, 61, which are separated from chamber 59 by said two ribs 56, and communicate directly with respective passages 62 defined by walls 34, 44 and walls 35, 45.

Each passage 62 communicates with cavity 42 through holes 48, 51, and with conduit 18 through a relative number of holes 68, which are formed through wall 34, 35, as an extension of chamber 60, 61, along respective axes substantially parallel to axis 24, and have respective outlets 69 in a row parallel to the outer edge 70, 71 joining wall 30 to wall 34, 35.

In actual use, cooling air is directed from cavity 42, on the one hand, into chambers 59 and onto walls 29, 30 to cool profile 20, and, on the other, through holes 48, 51 into the two passages 62, where walls 34, 44 and walls 35, 45 guide respective tangential streams F1 of cooling air (FIG. 2) to holes 68, i.e. from the low-pressure to the high-pressure side.

The air from outlets 69 is channelled into gaps 72 defined between platforms 14, 15 and walls 34, 35 (FIG. 1) to form another two streams F2 of cooling air (FIG. 2), which are tangential to walls 34, 35, are directed from the high-pressure to the low-pressure side by the pressure difference acting in the nozzles of conduit 18 on walls 29, 30, and therefore flow in the opposite direction to streams F1.

Passages 62, holes 68, and walls 44, 45 therefore form part of a device 74 for cooling walls 34, 35 by tangential streams F1, F2 of cooling air, and so achieving relatively high heat exchange efficiency enabling a reduction in the maximum amount of air required to cool walls 34, 35.

More specifically, a number of holes 68 terminating inside conduit 18, close to edges 70, 71, need simply be formed, leaving the rest of walls 34, 35 unchanged, to obtain streams F2, which are generated in gaps 72 by the pressure difference between the high-pressure and low-pressure sides of profile 20.

Moreover, walls 44, 45, and particularly portions 50 with no holes, guide the air in streams F1 towards holes 68 in the opposite direction to streams F2, thus improving the heat exchange efficiency of device 74.

Moreover, forming two rows of holes, as opposed to one, in walls 44, 45 and relatively far from edges 70, 71 provides for optimum, even cooling of the inside of walls 34, 35.

Finally, in addition to locating insert 41, ribs 56 also keep streams F1 separate from chambers 59, and therefore from most of the cooling system of walls 29, 30 defined by holes 57 in walls 54, 55 of insert 41.

Clearly, changes may be made to blade 19 as described herein with reference to the accompanying drawings, without, however, departing from the scope of the present invention.

In particular, holes 68 may be arranged along edges 70, 71 otherwise than as shown in FIG. 2, and holes 48, 51 may be formed in other than the preferred positions illustrated.

What is claimed is:

1. A blade (19) for a stator (11) of a variable-geometry turbine (1), particularly for aircraft engines; said stator comprising a supporting structure (14, 15); said blade comprising an airfoil profile (20) hinged to said supporting structure (14, 15) to rotate about an axis (24) inside a conduit (18) and comprising a pressure front wall (30) and a suction rear wall (29);

two end walls (34, 35) located at opposite ends of said airfoil profile (20), with respect to a direction parallel to said axis (24), and cooperating in sliding manner with said supporting structure (14, 15); and cooling means (74) for cooling said end walls (34, 35); said cooling means (74) comprising a number of holes (68) for the passage of a cooling fluid from an inner cavity (39) of said blade (19) and guide means (44, 45) for guiding a stream (F1) of cooling fluid inside said blade (19) and tangentially to at least one of said end walls (34, 35);

characterized in that said holes (68) have respective outlets (69) close to an outer edge (70, 71) joining at least one of said end walls (34, 35) and said front wall (30).

2. A blade as claimed in claim 1, characterized in that the outlets (69) of said holes (68) are formed in at least one of said end walls (34, 35).

3. A blade as claimed in claim 2, characterized in that the outlets (69) of said holes (68) are formed in a line parallel to said outer edge (70, 71).

4. A blade as claimed in claim 1, characterized in that said guide means (44, 45) define an inlet (48, 51) and an outlet (68) in such positions as to cause said stream (F1) of cooling fluid to flow in the opposite direction with respect to an external tangential stream (F2) of cooling fluid, which, in use, flows from said holes (68) towards said rear wall (29).

5. A blade as claimed in claim 4, characterized in that said guide means (44, 45) comprise at least one further end wall (44, 45) facing at least one of said end walls (34, 35); said at least one end wall (34, 35) and said at least one further end wall (44, 45) defining between them a substantially tangential passage (62) having an outlet (68) coincident with said holes, and an inlet (48, 51) formed in said at least one further end wall (44, 45).

6. A blade as claimed in claim 5, characterized in that said at least one further end wall (44, 45) comprises an intermediate portion (47), and a first and second end portion (49, 50) located on opposite sides of said intermediate portion (47) and adjacent to said rear wall (29) and said front wall (30) respectively; said second end portion (50) having no openings.

7. A blade as claimed in claim 6, characterized in that said inlet (48, 51) comprises first holes (51) formed in said first end portion (49) and in a row substantially parallel to said rear wall (29).

8. A blade as claimed in claim 7, characterized in that said inlet (48, 51) comprises second holes (48) formed in said intermediate portion (47) and in a row substantially parallel to the chord of said airfoil profile (20).

9. A blade as claimed in claim 5, characterized in that said at least one further end wall (44, 45) forms part of an insert (41) housed in said inner cavity (39).

10. A blade as claimed in claim 9, characterized in that said insert (41) comprises two lateral walls (55, 54) facing said front wall (30) and said rear wall (29) respectively, and forced onto respective supporting portions (56) on said front and rear walls (30, 29); each said lateral wall (55, 54) defining a chamber (59) with the relative said front or rear wall (30, 29); and separating means (56) being provided to separate said chamber (59) from said passage (62).

11. A blade as claimed in claim 10, characterized in that said separating means (56) comprise two ribs (56) integral with said front (30) or rear (29) walls and defining said supporting portions.

12. A blade as claimed in claim 1, characterized in that said holes (68) are formed in directions substantially parallel to said axis (24).

* * * * *